(12) United States Patent
Poss et al.

(10) Patent No.: US 10,825,474 B2
(45) Date of Patent: Nov. 3, 2020

(54) DATA STORAGE DEVICE REVERSE BIASING HEAD ELEMENT TO COUNTER ELECTRO-MIGRATION

(71) Applicant: Western Digital Technologies, Inc., San Jose, CA (US)

(72) Inventors: Joey M. Poss, Rochester, MN (US); Ian Robson McFadyen, San Jose, CA (US); Jih-shiuan Luo, San Jose, CA (US); Yunfei Ding, Fremont, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/777,658

(22) Filed: Jan. 30, 2020

(65) Prior Publication Data
US 2020/0168247 A1    May 28, 2020

Related U.S. Application Data

(63) Continuation of application No. 16/360,902, filed on Mar. 21, 2019, now Pat. No. 10,566,018.
(Continued)

(51) Int. Cl.
*G11B 11/10*    (2006.01)
*G11B 5/60*    (2006.01)
(Continued)

(52) U.S. Cl.
CPC ............ *G11B 5/6011* (2013.01); *G11B 5/012* (2013.01); *G11B 5/02* (2013.01); *G11B 2005/001* (2013.01)

(58) Field of Classification Search
CPC ......... G11B 11/10; G11B 15/02; G11B 27/36; G11B 5/09; G11B 5/00; G11B 5/54
(Continued)

(56) References Cited

U.S. PATENT DOCUMENTS

| 4,891,717 A | * | 1/1990 | Minuhin | G11B 5/09 360/40 |
| 6,163,425 A | | 12/2000 | Isokawa et al. | |

(Continued)

FOREIGN PATENT DOCUMENTS

| CN | 104835510 B | 11/2017 |
| JP | 2013251042 A | 12/2013 |

(Continued)

OTHER PUBLICATIONS

Mallary, Mike et al; "Head and Media Challenges for 3 Tb/in2 Microwave-Assisted Magnetic Recording"; IEEE Transactions on Magnetics, vol. 50, No. 7, Jul. 2014 (8 pages).

*Primary Examiner* — Nabil Z Hindi
(74) *Attorney, Agent, or Firm* — Patterson & Sheridan, LLP; Steven H. Versteeg

(57) ABSTRACT

A data storage device is disclosed comprising a first head actuated over a first disk surface, the first head comprising a plurality of elements including a first element. During a first write operation of the first head, a first bias signal having a first polarity is applied to the first element, and a write interval of the first write operation is measured. During a non-write mode of the first head, a second bias signal having a second polarity opposite the first polarity is applied to the first element during a reverse bias interval that is based on the write interval of the first write operation.

18 Claims, 3 Drawing Sheets

Related U.S. Application Data

(60) Provisional application No. 62/646,849, filed on Mar. 22, 2018.

(51) Int. Cl.
    *G11B 5/02*     (2006.01)
    *G11B 5/012*     (2006.01)
    *G11B 5/00*     (2006.01)

(58) Field of Classification Search
    USPC ... 360/59, 313, 62, 97.03, 97.04, 75, 46, 66, 360/68
    See application file for complete search history.

(56) References Cited

U.S. PATENT DOCUMENTS

| | | | |
|---|---|---|---|
| 7,130,141 B2 | 10/2006 | Chey et al. | |
| 7,330,336 B2 * | 2/2008 | Luo | G11B 5/314 360/125.31 |
| 7,957,093 B2 * | 6/2011 | Brand | G11B 5/3136 360/313 |
| 8,582,240 B1 | 11/2013 | Chen et al. | |
| 8,760,779 B2 | 6/2014 | Johns et al. | |
| 9,105,279 B2 | 8/2015 | Shiroishi | |
| 9,230,571 B1 | 1/2016 | Chen et al. | |
| 9,275,672 B2 | 3/2016 | Shiroishi et al. | |
| 9,311,934 B1 | 4/2016 | Shiimoto et al. | |
| 9,368,135 B2 | 6/2016 | Gao | |
| 9,881,637 B1 | 1/2018 | Wilson et al. | |
| 10,121,497 B1 | 11/2018 | Takahashi et al. | |
| 10,186,284 B2 | 1/2019 | Narita et al. | |
| 10,236,021 B2 | 3/2019 | Narita et al. | |
| 10,276,193 B2 | 4/2019 | Narita et al. | |
| 10,325,618 B1 | 6/2019 | Wu et al. | |
| 10,366,714 B1 | 7/2019 | Olson et al. | |
| 2008/0304176 A1 | 12/2008 | Takagishi et al. | |
| 2009/0059423 A1 | 3/2009 | Yamada et al. | |
| 2009/0310244 A1 | 12/2009 | Shimazawa et al. | |
| 2013/0250456 A1 | 9/2013 | Yamada et al. | |
| 2014/0139952 A1 | 5/2014 | Takeo et al. | |
| 2014/0177100 A1 | 6/2014 | Sugiyama et al. | |
| 2016/0027455 A1 | 1/2016 | Kudo et al. | |
| 2017/0236537 A1 | 8/2017 | Murakami et al. | |
| 2018/0268848 A1 | 9/2018 | Narita et al. | |
| 2019/0088274 A1 | 3/2019 | Narita et al. | |

FOREIGN PATENT DOCUMENTS

| | | |
|---|---|---|
| JP | 5468124 B2 | 4/2014 |
| WO | 2015126326 A1 | 8/2015 |

* cited by examiner

DATA STORAGE DEVICE REVERSE BIASING HEAD ELEMENT TO COUNTER ELECTRO-MIGRATION

CROSS-REFERENCE TO RELATED APPLICATIONS

This application is a continuation of U.S. patent application Ser. No. 16/360,902, filed on Mar. 21, 2019, which application claims benefit of U.S. Provisional Patent Application Ser. No. 62/646,849, filed Mar. 22, 2018, both of which are herein incorporated by reference.

BACKGROUND OF THE DISCLOSURE

Field of the Disclosure

Embodiments of the present disclosure generally relate to a data storage device.

Description of the Related Art

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Data is typically written to the disk by modulating a write current in an inductive coil (write coil) to record magnetic transitions onto the disk surface in a process referred to as saturation recording. During read-back, the magnetic transitions are sensed by a read element (e.g., a magneto-resistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Microwave assisted magnetic recording (MAMR) is also a recent development that improves the quality of written data by using a spin torque oscillator (STO) to apply a high frequency auxiliary magnetic field to the media close to the resonant frequency of the magnetic grains, thereby enabling the magnetic field generated by the write coil to more readily magnetize the disk surface. Since the quality of the write/read signal depends on the fly height of the head, conventional heads may also comprise an actuator for controlling the fly height. Any suitable fly height actuator (FHA) may be employed, such as a heater which controls fly height through thermal expansion, or a piezoelectric (PZT) actuator. A data storage device may also employ dual FHAs to achieve a first fly height during write operations and a second, different fly height during read operations.

SUMMARY OF THE DISCLOSURE

A data storage device is disclosed comprising a first head actuated over a first disk surface, the first head comprising a plurality of elements including a first element. During a first write operation of the first head, a first bias signal having a first polarity is applied to the first element, and a write interval of the first write operation is measured. During a non-write mode of the first head, a second bias signal having a second polarity opposite the first polarity is applied to the first element during a reverse bias interval that is based on the write interval of the first write operation.

In one embodiment, a data storage device comprises: a first disk surface; a first head actuated over the first disk surface, the first head comprising a plurality of elements including a first element; and control circuitry configured to: during a first write operation of the first head, apply a first bias signal having a first polarity to the first element; measure a write interval of the first write operation; and during a non-write mode of the first head, apply a second bias signal having a second polarity opposite the first polarity to the first element during a reverse bias interval that is based on the write interval of the first write operation.

In another embodiment, a method of operating a data storage device comprises: during a first write operation of a first head to a first disk surface, applying a first bias signal having a first polarity to a first element of the first head; measuring a write interval of the first write operation; and during a non-write mode of the first head, applying a second bias signal having a second polarity opposite the first polarity to the first element during a reverse bias interval that is based on the write interval of the first write operation.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Figure 1A:
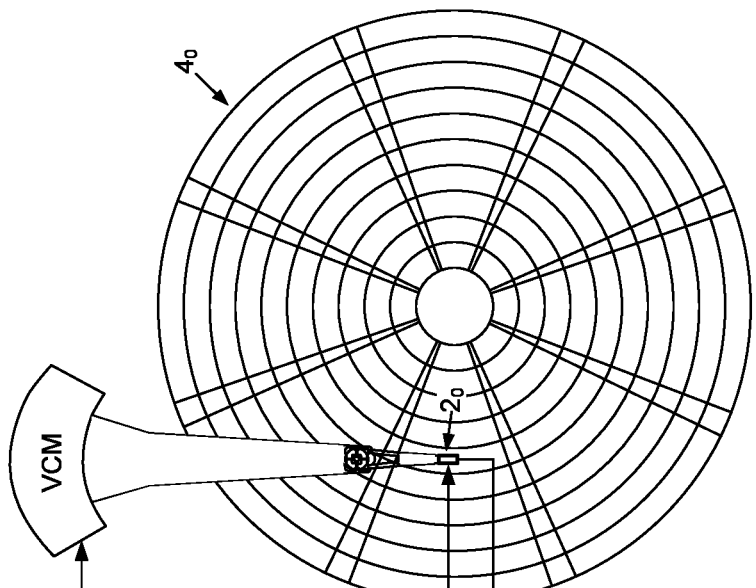
FIG. 1A shows a data storage device in the form of a disk drive according to an embodiment comprising a head actuated over a disk.
Figure 1B:
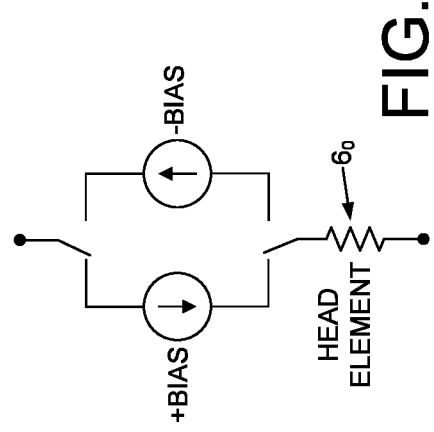
FIG. 1B shows a head according to an embodiment comprising at least one element that is biased with a first bias signal during a write operation, and biased with a second, opposite polarity bias signal during a non-write operation in order to counter an electro-migration effect.
Figure 1C:
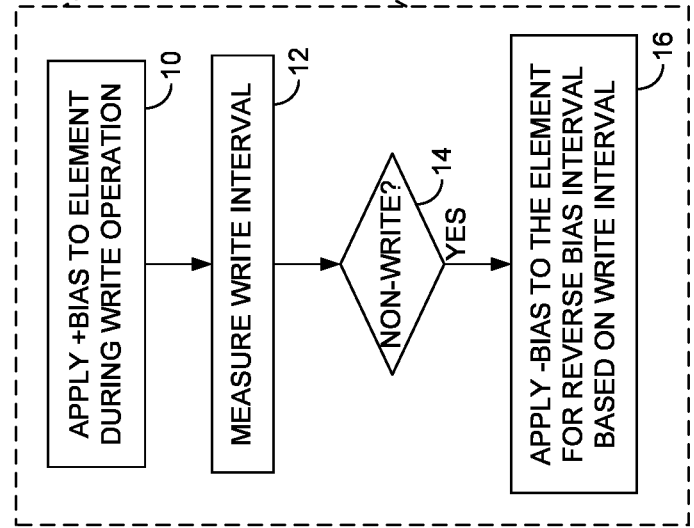
FIG. 1C is a flow diagram according to an embodiment wherein the reverse bias signal (opposite polarity bias signal) is applied to a write element of the head during a reverse-bias interval that is based on the write interval of write operation (s).

FIG. 1A shows a data storage device in the form of a disk drive according to an embodiment comprising a first head $2_0$ actuated over the first disk surface $4_0$, the first head $2_0$ comprising a plurality of elements including a first element $6_0$ (FIG. 1B). The disk drive further comprises control circuitry 8 configured to execute the flow diagram of FIG. 1C, wherein during a first write operation of the first head, a first bias signal having a first polarity is applied to the first element (block 10). A write interval of the first write operation is measured (block 12), and during a non-write mode of the first head (block 14), a second bias signal having a second polarity opposite the first polarity is applied to the first element during a reverse bias interval that is based on the write interval of the first write operation (block 16).

The first head shown in FIG. 1A may comprise any suitable elements, such as a write coil, a heat assisted element for use in heat assisted magnetic recording (HAMR), a fly height actuator, or a spin torque oscillator (STO) or other suitable resistive element proximate the write element for use in microwave assisted magnetic recording (MAMR). During a write operation, a suitable bias signal (e.g., a positive bias current in the embodiment shown in FIG. 1B) is applied to at least one of the elements, for example, to cause a STO to begin oscillating. In one embodiment, the bias signal applied to the head element during write operation(s) results in an electro-migration effect (the transport of material caused by the gradual movement of ions in a conductor due to the momentum transfer between conducting electrons and diffusing metal atoms). In one embodiment, in order to counter the electro-migration effect due to write operation(s), a bias signal having an opposite polarity (e.g., a negative bias current as shown in FIG. 1B) is applied to the head element during a non-write mode over a reverse bias interval that is based on the write interval(s) of the write operation(s).

Figure 2A:
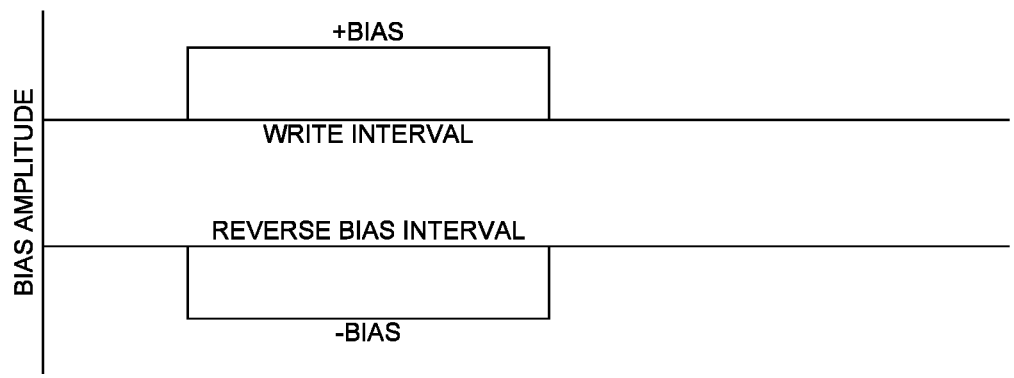
FIG. 2A shows an embodiment wherein an amplitude of the reverse bias signal equals the amplitude of the write bias signal, and the reverse bias interval equals the write interval of a write operation.
Figure 2B:
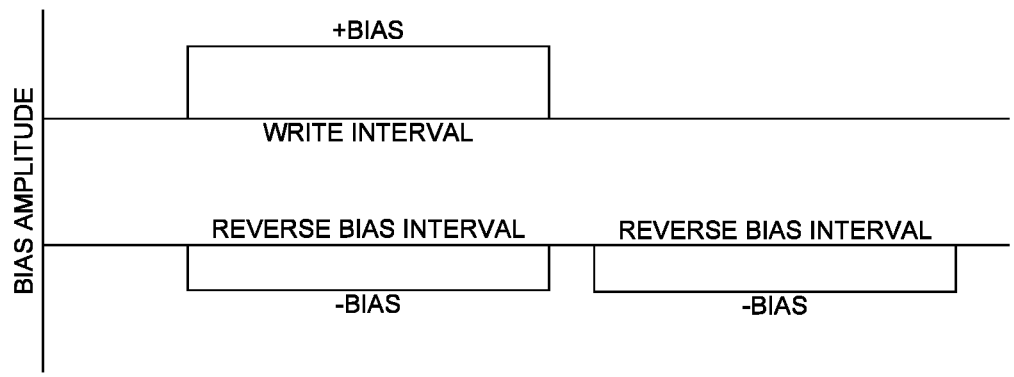
FIG. 2B shows an embodiment wherein an amplitude of the reverse bias signal is less than the amplitude of the write bias signal, and therefore the reverse bias interval is greater than the write interval of a write operation (e.g., half the amplitude and twice the write interval).

FIG. 2A shows an embodiment wherein an amplitude of the reverse bias signal (opposite polarity bias signal) during the reverse bias interval equals the amplitude of the write bias signal, and the reverse bias interval equals the write interval of a write operation. In this manner, the electro-migration effect that occurs during the write operation is effectively countered by the reverse bias signal. However, in one embodiment applying a high amplitude reverse bias signal during the reverse bias interval may reduce the longevity of the head element due, for example, to increased heating of the head element. Accordingly in one embodiment shown in FIG. 2B, the amplitude of the reverse bias signal may be less than the amplitude of the bias signal applied during the write operation. In this embodiment, the reverse bias interval over which the reverse bias signal is applied is increased relative to the write interval of the write operation. In the example of FIG. 2B, the amplitude of the reverse bias signal is half the amplitude of the write bias signal applied during the write operation, and the reverse bias interval for countering the electro-migration effect is twice the write interval. In other embodiments, the relationship between the amplitude of the reverse bias signal and the length of the reverse bias interval relative to the amplitude of the write bias signal and the write interval may be configured based on any suitable function, such as any suitable polynomial, exponential, etc.

The reverse bias signal may be applied to a head element during any suitable non-write mode of the corresponding head. For example, in one embodiment the reverse bias signal may be applied to the head element during an idle mode of the corresponding head. In yet another embodiment, the reverse bias signal may be applied during a read operation of the corresponding head if reverse biasing the head element will not adversely affect the read operation. For example, in one embodiment an STO may be reverse biased with an opposite polarity bias signal during a read operation since the STO will not oscillate when no write current is applied to the write coil.

Figure 3A:
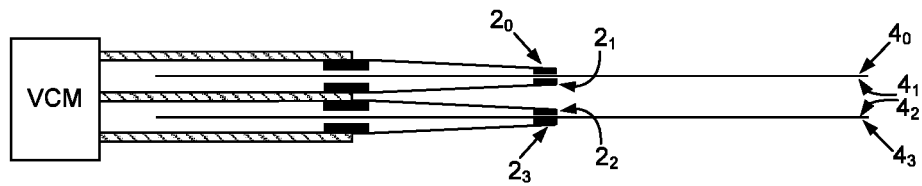
FIG. 3A shows an embodiment wherein the disk drive comprises multiple disk surfaces and a corresponding head actuated over each disk surface.
Figure 3B:
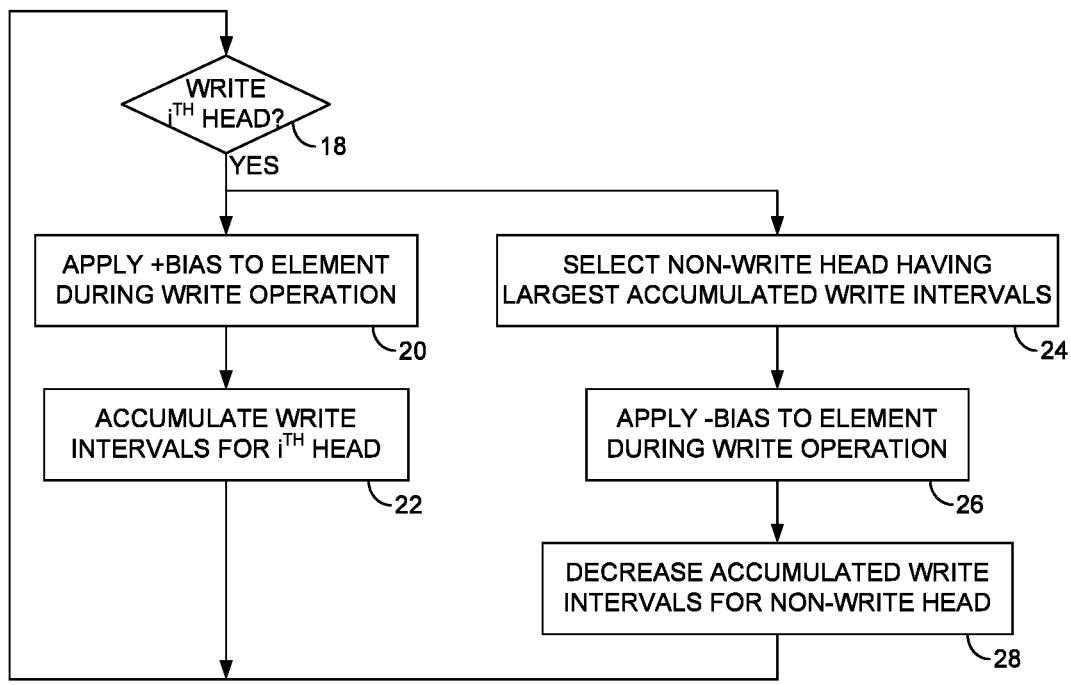
FIG. 3B is a flow diagram according to an embodiment wherein the write intervals for each head is accumulated, and during a write operation using a first one of the heads, the reverse bias signal is applied to a second one of the heads having the largest accumulated write intervals.

FIG. 3A shows an embodiment wherein the disk drive comprises multiple heads $2_0$-$2_3$ each actuated over a respective disk surface $4_0$-$4_3$, wherein in one embodiment the write intervals for each head is accumulated, and the reverse bias signal is applied during a non-write mode of the head based on the accumulated write intervals. An example of this embodiment is shown in the flow diagram of FIG. 3B wherein when a write operation is executed (block 18) for one of the heads $2_0$-$2_3$, the write bias signal is applied to an element of the head (block 20), and the write interval of the write operation is accumulated for the head (block 22). Also in connection with executing the write operation, the head having the largest accumulated write intervals which is not being used for the write operation is selected (block 24). During the write operation, the reverse bias signal is applied to an element of the selected head (block 26), and the accumulated write intervals for the head is decreased (block 28). In one embodiment, the amount the accumulated write intervals is decreased at block 28 for the non-write head is based on the amplitude of the reverse bias signal as described above with reference to FIGS. 2A and 2B.

In one embodiment, the control circuitry 8 of FIG. 1A is configured to apply the write bias signal to an element of the active head during a write operation, and to concurrently apply the reverse bias signal to an element of a selected one of the inactive heads during the write operation. That is, in one embodiment concurrently applying the write bias signal and the reverse bias signal to respective heads simplifies the design of the control circuitry 8, and may also minimize the interfacing transmission lines between the control circuitry 8 and the heads. In an alternative embodiment, the reverse bias signal may be applied to a selected head during a non-write mode, for example, during a read operation or during an idle mode of the disk drive. In one embodiment, the reverse bias signal may be applied during a read operation to a head that is used to perform the read operation. For example, the reverse bias signal may be applied to an STO element of a head while concurrently using the same head to read data from the disk since the STO will not oscillate when no write current is applied to the write coil.

In one embodiment, the head elements may be reversed biased over reverse bias intervals so as to maintain a substantial equilibrium in the electro-migration effect. In one embodiment, if the accumulated write intervals for one of the heads increases above a predetermined threshold, write operations to the corresponding disk surface may be redirected to a different disk surface, or in another embodiment deferred by temporarily caching the write data in a non-volatile semiconductor memory (e.g., Flash memory). While the write operations are redirected or deferred for a particular head, the head element(s) may be reverse biased to counter the electro-migration effect and thereby decrease the accumulated write intervals for the head. In one embodiment, the threshold used to trigger a redirect or deferment of write operations may include any suitable hysteresis before re-enabling write operations to the corresponding disk surface. That is, write operations to a particular disk surface may be redirected or deferred until the accumulated write intervals for the head falls below a hysteretic threshold.

In the embodiment of FIG. 1B, the write bias signal and reverse bias signal applied to the head element $6_0$ is a bias current, for example, for biasing an STO of a MAMR disk drive. In other embodiments, the write bias signal and the reverse bias signal may be a bias voltage applied to the head element $6_0$ which causes a current to flow through the head element. In addition, the reverse bias signal applied to the head element during the reverse bias interval may be of any suitable form, such as a DC signal as shown in the embodiment of FIG. 2A. In another embodiment, the reverse bias signal may be applied as a periodic signal to the head element. For example, the reverse bias signal may be a square wave having any suitable amplitude and duty cycle, wherein in one embodiment a smaller duty cycle may increase the longevity of the head element by decreasing stress (e.g., heating) of the head element.

Figure 4:
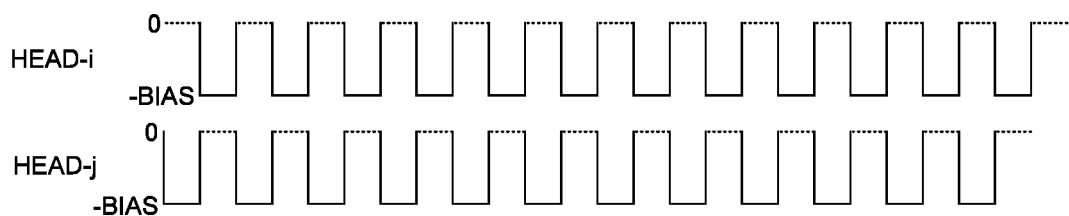
FIG. 4 shows an embodiment wherein a square wave reverse bias signal is applied to at least two head elements during the reverse bias interval, wherein the square waves are phase offset and de-multiplexed onto the respective head elements.

FIG. 4 shows an embodiment wherein a square wave reverse bias signal is applied to at least two head elements during the reverse bias interval, wherein the square waves are phase offset and de-multiplexed onto the respective head elements. For example, the reverse bias signal (generated as a DC signal) may be first applied to the element of head i for a predetermined interval, and then applied to the element of head j for a predetermined interval in an alternating sequence, thereby applying a square wave reverse bias signal to each head element as shown in FIG. 4. Accordingly in this embodiment, the electro-migration effect of multiple head elements may be counteracted during the reverse bias interval so as to minimize the overall time needed to equalize the head elements as well as prolonging the longevity of the head elements.

In other embodiments, a similar square wave reverse bias signal may be applied to three or more head elements by de-multiplexing a DC bias signal over the multiple head elements during the reverse bias interval. In this embodiment, the duty cycle of the square wave reverse bias signal applied to each head element will be reduced proportional to the number of head elements being reverse biased. In one embodiment, reducing the duty cycle enables increasing the amplitude of the square wave without stressing the head elements. In one embodiment, the amplitude and effective duty cycle of the reverse bias square wave may be configured based on the accumulated write intervals for each head element. For example, in one embodiment the larger the accumulated write intervals, the larger the amplitude and/or duty cycle applied to the corresponding head element.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, hybrid drives (disk plus solid state), etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
  a first disk surface;
  a first head actuated over the first disk surface, the first head comprising a plurality of elements including a first element; and
  control circuitry configured to:
    during a non-write mode of the first head, apply a bias signal having a polarity to the first element during a reverse bias interval that is based on a write interval of a write operation, wherein the polarity is opposite a polarity used in the write operation; and
    during the non-write mode of the first head, apply the bias signal to the first element during a reverse bias interval that is based on accumulated write intervals.

2. The data storage device as recited in claim 1, wherein the first element is at least one of a write coil, a heat assisted element, a fly height actuator, a spin torque oscillator, and a resistive element.

3. A data storage device, comprising:
  a first disk surface;
  a first head actuated over the first disk surface, the first head comprising a plurality of elements including a first element; and
  control circuitry configured to:
    during a non-write mode of the first head, apply a bias signal having a polarity to the first element during a reverse bias interval that is based on a write interval of a write operation, wherein the polarity is opposite a polarity used in the write operation, wherein:
    the reverse bias interval is different than the write interval by an amount that is based on a difference between an amplitude of the bias signal and an amplitude of a write signal.

4. A data storage device, comprising:
  a first disk surface;
  a first head actuated over the first disk surface, the first head comprising a plurality of elements including a first element; and
  control circuitry configured to:
    during a non-write mode of the first head, apply a bias signal having a polarity to the first element during a reverse bias interval that is based on a write interval of a write operation, wherein the polarity is opposite a polarity used in the write operation
  a second head actuated over a second disk surface, wherein the control circuitry is further configured to apply the bias signal to the first element during a write mode of the second head.

5. The data storage device as recited in claim 4, wherein the second head comprises a second element, and the control circuitry is further configured to:
  during a non-write mode of the second head, apply the bias signal to the second element during a reverse bias interval that is based on a write interval of a second write operation.

6. The data storage device as recited in claim 5, wherein the control circuitry is further configured to:
  during a non-write mode of the first and second heads, apply the bias signal to one of the first and second elements based on accumulated write intervals.

7. The data storage device as recited in claim 6, wherein the control circuitry is further configured to apply the bias signal to the first element when the accumulated write intervals for the first head is longer than the accumulated write intervals for the second head.

8. The data storage device as recited in claim 5, wherein the control circuitry is further configured to:
  when accumulated write intervals for the first head exceeds a threshold:
    temporarily disable write operations to the first disk surface; and
    apply the bias signal to the first element while the write operations to the first disk surface are disabled.

9. The data storage device as recited in claim 8, wherein while the write operations to the first disk surface are disabled, the control circuitry is further configured to perform at least one of:
  redirect write operations initially targeting the first disk surface to the second disk surface; and
  cache write data of the write operations targeting the first disk surface.

10. A method of operating a data storage device, the method comprising:
  during a non-write mode of a first head having a first element, applying a bias signal having a polarity to the first element during a reverse bias interval that is based on a write interval of a write operation; and
  during the non-write mode of the first head, applying the bias signal to the first element during a reverse bias interval that is based on accumulated write intervals.

11. The method as recited in claim 10, wherein the first element is at least one of a write coil, a heat assisted element, a fly height actuator, a spin torque oscillator, and a resistive element.

12. A method of operating a data storage device, the method comprising:
  during a non-write mode of a first head having a first element, applying a bias signal having a polarity to the first element during a reverse bias interval that is based on a write interval of a write operation, wherein:
  the reverse bias interval is different than the write interval by an amount that is based on a difference between a first amplitude of the bias signal and an amplitude of a write signal.

13. A method of operating a data storage device, the method comprising:
  during a non-write mode of a first head having a first element, applying a bias signal having a polarity to the first element during a reverse bias interval that is based on a write interval of a write operation; and
  applying the bias signal to the first element during a write mode of a second head to a second disk surface.

14. The method as recited in claim 13, further comprising:
  during a non-write mode of the second head having a second element, applying the bias signal to the second element during a reverse bias interval that is based on the write interval of a second write operation.

15. The method as recited in claim 14, further comprising:
during a non-write mode of the first and second heads,
applying the bias signal to one of the first and second elements based on accumulated write intervals.

16. The method as recited in claim 15, further comprising applying the bias signal to the first element when the accumulated write intervals for the first head is longer than the accumulated write intervals for the second head.

17. The method as recited in claim 14, further comprising:
when accumulated write intervals for the first head exceeds a threshold:
temporarily disabling write operations to a first disk surface; and
applying the bias signal to the first element while the write operations to the first disk surface are disabled.

18. The method as recited in claim 17, wherein while the write operations to the first disk surface are disabled, further comprising at least one of:
redirecting write operations initially targeting the first disk surface to the second disk surface; and
caching write data of the write operations targeting the first disk surface.

\* \* \* \* \*